Aug. 29, 1950  R. FREEDMAN  2,520,836
BRASSIERE
Filed July 23, 1946  2 Sheets-Sheet 2
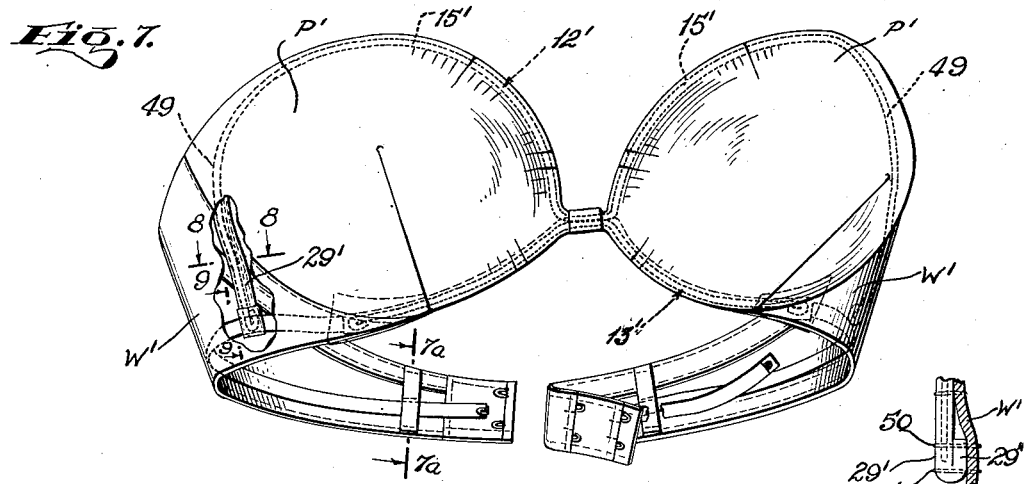
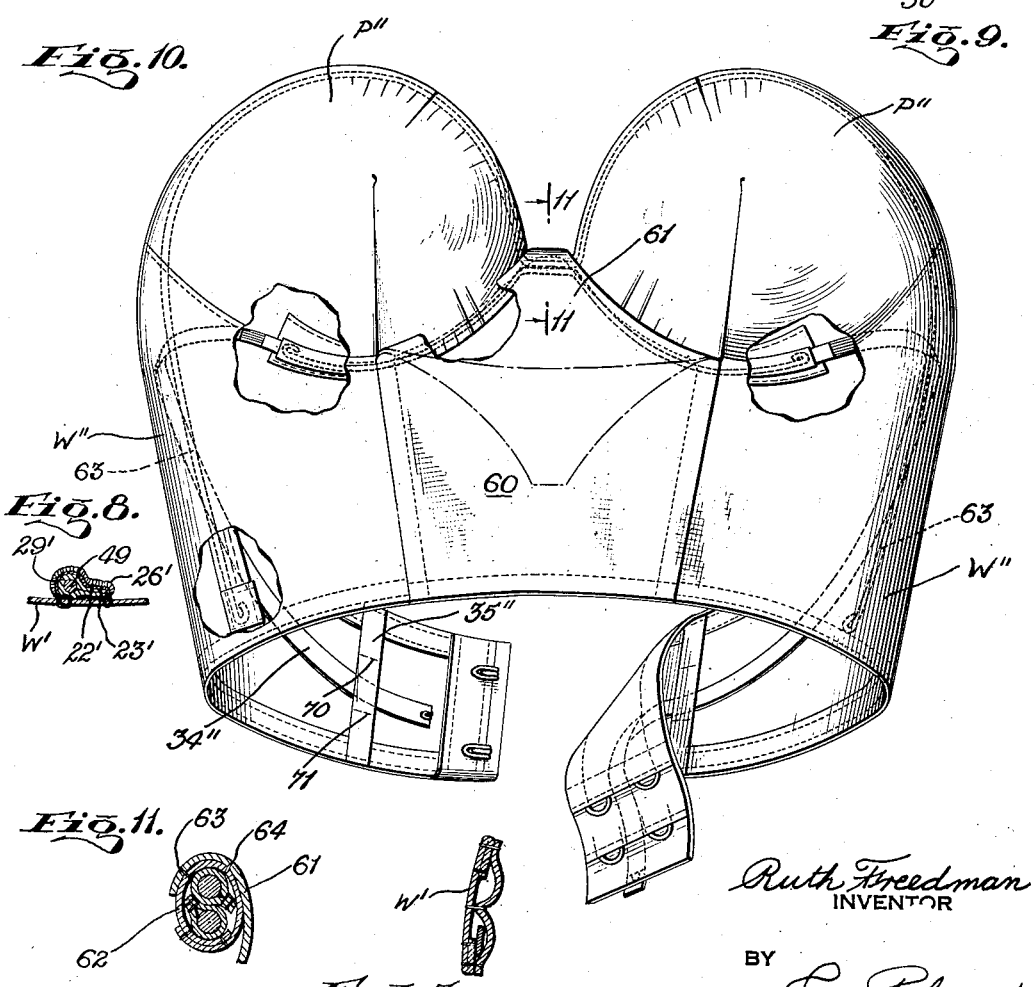
Ruth Freedman
INVENTOR
BY
Cm Palmer
ATTORNEY Patented Aug. 29, 1950

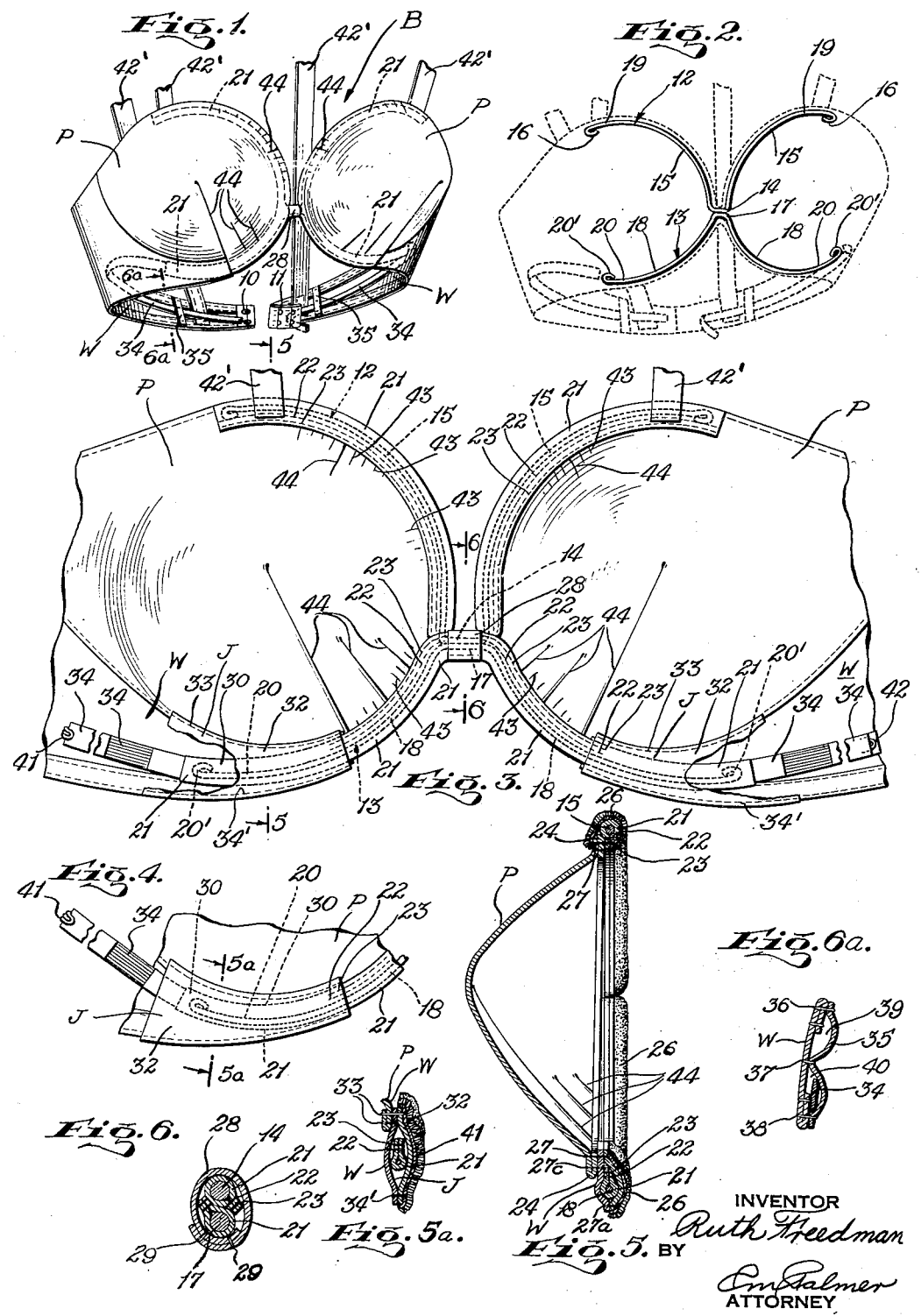

2,520,836

UNITED STATES PATENT OFFICE 2,520,836

BRASSIÈRE

Ruth Freedman, New York, N. Y.

Application July 23, 1946, Serial No. 685,623

5 Claims. (Cl. 2—42)

The present invention is directed to a functionally and structurally improved sculptured and/or strapless brassière and the objects thereof are as follows; to minimize large bosoms; to provide complementary upper and lower frames for comfortably encasing the breasts to simulate youthful and healthful appearance; to create a pleasing décolleté effect by providing a relatively low plunging neckline; to effectively retain the bosom against chafing and yet desirably support the ligaments thereof to obtain a youthful uplift effect; to provide complementary upper and lower frames to maintain ample division of the breasts to provide a flattering youthful appearance; to provide a centre panel adapted to be adjusted for enhancing division of the bosom; to desirably confine the bosom to provide a more compact and rounded appearance and to preclude bulging of the breasts at the upper part of the brassière; to provide compensatory and adjustable means to preclude the lower frame from touching or chafing the side portions of the breasts; to provide a novel strapless brassière even serviceable for heavy bosoms; and to provide complementary upper and lower preformed, multiarched complementary frames for maintaining the bosom in a natural position to relax the ligaments concomitantly enhancing the appearance in the matter of obtaining an alluring youthful contour. Other important objects, advantages and functional and structural features of the invention will appear from the following detailed specification taken with the accompanying drawings wherein:

Fig. 1 is a perspective view of a sculptured brassière according to one embodiment of the invention.

Fig. 2 is a view similar to Fig. 1 but illustrating in full lines the upper and lower complementary frames.

Fig. 3 is an enlarged fragmentary and inside view of Fig. 1, partly broken away to show the internal construction.

Fig. 4 is a fragmentary view of Fig. 3, however, illustrating one of the adjustable terminals of the lower frames elevated.

Fig. 5 is a transverse sectional view on the line 5—5 of Fig. 3.

Fig. 5ª is a transverse sectional view on the line 5ª—5ª of Fig. 4, however, also illustrating the plush protective lining.

Fig. 6 is a transverse sectional view on the line 6—6 of Fig. 3.

Fig. 6ª is a sectional view on the line 6ª—6ª of Fig. 1.

Fig. 7 is a perspective view of another embodiment according to the invention, however, illustrating a strapless brassière.

Fig. 7ª is a transverse sectional view on the line 7ª—7ª of Fig. 7.

Fig. 8 is a transverse sectional view on the line 8—8 of Fig. 7.

Fig. 9 is a sectional view on the line 9—9 of Fig. 7.

Fig. 10 is a perspective view of another embodiment, and

Fig. 11 is a sectional view on the line 9—9 of Fig. 8.

In the form according to Figs. 1 to 6ª, the strapless brassière B embodies spaced fabric pockets P desirably secured to tapering wing portions W adapted to be removably secured by the hook and eye fastener means 10 and 11.

Complementary upper and lower resilient and flexible wire frames broadly denoted 12 and 13 are secured to inner, upper and lower margins of pockets P. The upper frame 12 has a rectilinear intermediate portion 14 from which project the upwardly and outwardly extending arched limbs 15 each terminating in a reversely bent portion 16. The lower wire frame 13 also embodies a rectilinear intermediate portion 17 integrally merged with the downwardly and outwardly projecting arcuate or arched limbs 18. The end portions 19 of the upper limbs 15 also curve downwardly. The end portions 20 of the lower arched limbs 18 curve upwardly and terminate in the reversely bent portions 20'.

The upper and lower resilient wire frames are in such sizes and shapes to encase and retain the breasts and each is fully closely housed and confined in a fabric protective covering 21 by the lines of stitching 22 and 23. The lines of stitching 23 also secure the protective wire coverings 21 to the lips or margins 24 of the breast receiving pockets P.

To preclude direct contact of the covered frames 12 and 13 against the flesh, a plush lining 26 if desired may be secured to the covers 21 of the upper and lower frames and to the lips 24 of the pockets by lines of stitching as 27. For purposes of clarity the plush linings for the frames are not shown in Figs. 1–3. Supplementary line of stitching 27ª (Fig. 5) also secures the lower part of the plush lining to the wings W also fastened by the line of stitching 27ᶜ to the lower margins 24.

The rectilinear juxtapositioned bridge portions 14 and 17 of the frames 12 and 13 are closely but rotatably confined or journalled in the fabric socket or tie means 28 (Fig. 6) having its ends fastened by the stitching 29. By this construction, the frames 12 and 13 may be tilted relative to each other.

According to the invention, the lower end portions 30 of the protective coverings or casings 21 are movably confined in a strip 32 attached by the upper lines of stitching 33 (Fig. 5ª) to the bottom parts of the pockets P and to the upper parts of the wings W. The lower lines of stitching 34' secure strips 32 to the lower parts of the wings W. In effect strips 32 together with wings W characterize a tapering hollow jacket J flaring outwardly.

It should be observed in Fig. 3 that the lines of stitching 22 and 23 securing the protective coverings 21 of the lower frame 13 terminate after slightly entering the jackets J. Consequently the remaining portions of the coverings 21 are detached from the pockets P and thus may be elevated or lowered within the jackets. For this purpose, straps 34 are desirably fastened in any well known manner to the outer ends of the protective coverings 21. By actuating these straps the portions of the lower frame 13 within and detached from the wings W may be pulled or driven downwardly that is away from the adjacent pocket P. For maintaining the depressed or elevated relation of the outer ends of the lower frame 13, the straps 34 are each removably and selectively retained in keeper means defined by a strip 35 and its wing W. Each strip 35 is secured to its wing by the lines of stitching 36, 37 and 38 (Fig. 6ª). Thus several openings as 39 and 40 are provided in which the strap 34 may be retained to maintain the depressed or elevated relation of the ends of the lower frame. The straps 34 are provided with hook and eye means 41 and 42 (Fig. 3). Plush linings 41 (Fig. 5ª) are desirably secured to the strips 32 for protective purposes. Such linings, however, are not shown in Figs. 1–4 to avoid confusion. Conventional shoulder straps 42' are secured to the wings and pockets P. The pockets P are provided with a plurality of small easing in wrinkles 43, that is, shirred so that the bust will be effectively encased to provide a more rounded effect and to preclude bulging of the bosom over the top of the brassière. These pockets are also provided with a plurality of darts or folds 44 to provide for more uplift support and restore the elevation of the bosom for a more youthful effect.

The complementary frames 12 and 13 also provide more support for the bosom for retaining the latter in a natural position, consequently relaxing the ligaments of the breast. Moreover, since the limbs 15 of the upper frame 12 descend rather abruptly towards the middle of this frame and to a low elevation, the upper parts of the bust are desirably encased and since these limbs are appreciably spaced apart, ample division for breasts is provided. Thus by the present invention a woman who formerly could not wear a low neck dress may by the herein invention obtain a youthful effect with ample division and low plunging neckline. Furthermore, the upper frame retains the breast in place to obviate spillage of heavy breasts over the top of the brassière, thus overcoming the watermelon or shelflike appearance with no division. The present invention does away with these disadvantages.

As previously stated, the lower frames may be adjusted to keep their terminals away from the breasts. Thus these terminals cannot touch the sides of the breasts and in all instances the terminals of the frames are reflexed as at 16 and 20' to preclude sharp edges.

Briefly recapitulating, by the present invention the breasts are comfortably retained in the within frames, thus minimizing the size of large bosoms. Also an enhanced décolleté effect is provided producing a relatively low neckline with ample division to create a flattering cool and attractive appearance.

In the form illustrated in Fig. 7 the shoulder straps 42 of Fig. 1 are eliminated. However, the upper arched or convexed limbs 15' depend or extend downwardly to provide branches 49 which terminate at the lower margin of the wings W'. These limbs 15' and branches are also encased in protective coverings 29' desirably secured to the wings W' and to the upper portions of the pockets P', for example, by lines of stitching 22' and 23' (Fig. 8). The protective coverings 29' are appropriately covered by a plush protective lining 26' fastened by lines of stitching to the wings and the pockets. The ends of the protective coverings 29' are turned back upon themselves as indicated in Fig. 9 and these portions are secured by the lines of stitching 50 to the wings W'. In other aspects the strapless brassière illustrated in Fig. 7 is substantially along the lines shown in Figs. 1–6ª.

In the embodiment according to Figs. 10 and 11, the wings W'' extend downwardly from the pockets to the hip of the wearer. A panel 60 interconnects with and is secured to these wings. This panel has an upper tapered portion 61 sewn to the lower portions of the pockets P'' and is fastened by the lines of stitching 63 and 64 (Fig. 11) to the socket or bearing 62. This tapered portion 61 maintains the desired flatness of the brassière against the chest and enhances the division of the breasts. In other aspects the form according to Fig. 8 is along the lines of the embodiment illustrated in Figs. 1–8, 10 and 11 except that in Fig. 10 the strip 35'' is secured to wings W'' by two spaced lines of stitching 70 and 71 to provide added adjustment of the straps 34''.

Branches 49 in Fig. 7 and branches 63 in Fig. 10 hold distended and preclude wrinkling of the wings of the brassières.

If straps as 34 are not retained in openings as 39 and 40 defined by the keeper means and the wings, the terminals of the lower frames automatically retract or raise upwardly due to their inherent resiliency (Fig. 4).

In operation the upper frames in all the embodiments disclosed desirably encase the breasts to provide a décolleté effect with ample division. The lower frames may be held retained in a set position when the straps 34 are selectively retained in openings as 39 or 40 (Fig. 6ª), thus holding the lower frames away from breasts to preclude chafing.

In all cases after the brassière is mounted about the body of the wearer, straps as 34 are disconnectably secured. Thereafter the wings as W are disengageably fastened.

Of course the straps as 34 when locked by the keeper means as 35 hold the coverings as 21 about the lower frames in an adjusted position within the jackets as J.

Concerning the lower frame, the diverging arched limbs as 18 thereof may be said to each comprise a downwardly and outwardly curved element secured fixedly to a lower margin of an adjacent pocket and an upwardly and outwardly curved element independent or free of this lower margin and detached from the associated pocket and wing.

As many changes could be made in the above described constructions and many widely different or structural embodiments could be devised without departing from the scope thereof, it is intended that all matter hereinbefore described in the specification and illustrated in the accompanying drawings shall be interpreted as illustrative and not in a limiting sense.

I claim:

1. In a brassière, spaced wings, spaced pockets secured to said wings, a wire frame comprising a horizontally arranged bridge interposed between said pockets and embodying arcuate limbs integral with said bridge, said limbs comprising downwardly and outwardly curved elements extending from said bridge and fixedly retained to the lower margins of said pockets and upwardly and outwardly curved elements independent and free of said margins and detached from said wings, and strap means at the outer ends of said upwardly and outwardly curved elements for displacing the latter towards or away from said margins.

2. In a brassière, spaced wings, spaced pockets secured to said wings, a wire frame comprising a horizontally arranged bridge interposed between said pockets and embodying arcuate limbs integral with said bridge, protective coverings surrounding said limbs, said limbs comprising downwardly and outwardly curved elements extending from said bridge and having their portions of said protective coverings fixedly secured to the lower margins of said pockets and comprising upwardly and outwardly curved elements independent and free of said margins and having their portions of said protective coverings detached from said wings, and strap means secured to the outer ends of said coverings on said upwardly and outwardly curved elements for displacing the latter towards or away from said margins.

3. In a brassière, spaced pockets, wings secured to said pockets, upper and lower frames, said upper frame comprising an intermediate portion and oppositely projecting and laterally extending upwardly and outwardly diverging arched members, coverings for said members secured to upper marginal portions of said pockets, said lower frame having a bridge portion interposed between said pockets and contiguous to said intermediate portion and having arcuate limbs integral with said bridge portion, protective casings surrounding said limbs, said limbs comprising downwardly and outwardly curved and diverging elements extending from said bridge portion and having their respective parts of said protective casings fixedly secured to the lower margins of said pockets and comprising upwardly and outwardly curved elements independent of said lower margins and having their respective parts of said protective casings detached from and free of said wings and lower margins, strap means secured to the outer ends of said casings on said upwardly and outwardly curved elements for displacing the latter towards or away from said margins, and tie means for holding said intermediate portion and bridge portion in contiguous relation.

4. In a brassière, a body having spaced pockets, wings secured to said pockets, upper and lower frames, said upper frame comprising an intermediate portion and oppositely projecting and laterally extending upwardly and outwardly diverging arched members, coverings for said members secured to upper marginal portions of said pockets, said lower frame having a bridge portion interposed between said pockets and contiguous to said intermediate portion and having arcuate limbs integral with said bridge portion, protective casings surrounding said limbs, said limbs comprising downwardly and outwardly curved and diverging elements extending from said bridge portion and having their respective parts of said protective casings fixedly secured to the lower margins of said pockets and comprising upwardly and outwardly curved elements independent and free of said lower margins and having their respective parts of said protected casings detached from said margins and wings, strap means secured to the outer ends of said casings on said upwardly and outwardly curved elements for displacing the latter towards or away from said margins, tie means for holding said intermediate portion and bridge portion in contiguous relation, and a panel interconnecting said wings and having an upper tapered portion projecting upwardly and between said downwardly and outwardly curved elements and secured to said wings and tie means.

5. In a brassière, a body having spaced pockets, wings secured to said pockets, upper and lower frames, said upper frame comprising an intermediate portion and oppositely projecting and laterally extending upwardly and outwardly arched members, coverings for said members secured to upper marginal portions of said pockets, said lower frame having a bridge portion interposed between said pockets and contiguous to said intermediate portion and having arcuate limbs integral with said bridge portion, protective casings surrounding said limbs, said limbs comprising downwardly and outwardly curved downwardly diverging elements extending from said bridge portion and having their respective parts of said protective casings fixedly secured to the lower margins of said pockets and comprising upwardly and outwardly curved elements independent of said lower margins and having their respective parts of said protected coverings detached from and free of said lower margins and wings, strap means secured to the outer ends of said casings on said upwardly and outwardly curved elements for displacing the latter towards or away from said lower margins, tie means for holding said intermediate portion and bridge portion in contiguous relation, and said upper frame member having branches straddling said lower frame and extending downwardly along said wings and secured thereto.

RUTH FREEDMAN.

REFERENCES CITED

The following references are of record in the file of this patent:

UNITED STATES PATENTS

| Number | Name | Date |
| --- | --- | --- |
| 1,009,297 | Gabeau | Nov. 21, 1911 |
| 1,472,796 | Fritz | Nov. 6, 1923 |
| 1,837,958 | Ferrero | Dec. 22, 1931 |
| 2,045,401 | Mowry | June 23, 1932 |
| 2,239,056 | Schiffer | Apr. 22, 1941 |
| 2,421,448 | Witkower | June 3, 1947 |
| 2,436,094 | Bowen | Feb. 17, 1948 |
| 2,454,152 | Glick | Nov. 16, 1948 |

FOREIGN PATENTS

| Number | Country | Date |
| --- | --- | --- |
| 487,971 | France | May 21, 1918 |
| 548,177 | France | Oct. 13, 1922 |
| 771,567 | France | July 30, 1934 |
| 781,297 | France | Feb. 18, 1935 |
| 854,831 | France | Jan. 29, 1940 |
| 413,228 | Great Britain | July 12, 1934 |